(12) United States Patent
Asthana et al.

(10) Patent No.: US 11,100,140 B2
(45) Date of Patent: Aug. 24, 2021

(54) GENERATION OF DOMAIN SPECIFIC TYPE SYSTEM

(71) Applicant: International Business Machines Corporation, Armonk, NY (US)

(72) Inventors: Avinash Asthana, London (GB); John F. Pitrelli, Danbury, CT (US); Edward J. Biddle, Southampton (GB); Vijai Gandikota, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 262 days.

(21) Appl. No.: 15/997,067

(22) Filed: Jun. 4, 2018

(65) Prior Publication Data
US 2019/0370385 A1    Dec. 5, 2019

(51) Int. Cl.
*G06F 17/00*    (2019.01)
*G06F 16/28*    (2019.01)
*G06K 9/62*    (2006.01)
*G06N 20/00*    (2019.01)

(52) U.S. Cl.
CPC ......... *G06F 16/285* (2019.01); *G06K 9/6218* (2013.01); *G06K 9/6267* (2013.01); *G06N 20/00* (2019.01)

(58) Field of Classification Search
None
See application file for complete search history.

(56) References Cited

U.S. PATENT DOCUMENTS

| 6,081,750 | A | 6/2000 | Hoffberg et al. |
| 7,496,593 | B2 | 2/2009 | Gardner et al. |
| 7,606,714 | B2 | 10/2009 | Williams et al. |
| 8,352,405 | B2 | 1/2013 | Fang et al. |
| 8,812,321 | B2 | 8/2014 | Gilbert et al. |
| 8,880,392 | B2 | 11/2014 | Abir |
| 8,949,233 | B2 | 2/2015 | Hsiao et al. |
| 8,996,587 | B2 | 3/2015 | Kar et al. |
| 9,183,274 | B1 * | 11/2015 | Zhang ............... G06F 16/3344 |
| 9,449,080 | B1 * | 9/2016 | Zhang ............... G06F 16/3331 |
| 9,607,018 | B2 | 3/2017 | Morrison et al. |
| 10,303,999 | B2 * | 5/2019 | Hertz ................. G06Q 10/10 |
| 2003/0005412 | A1 | 1/2003 | Eanes |

(Continued)

FOREIGN PATENT DOCUMENTS

WO    2016116132 A1    7/2016

*Primary Examiner* — Tuankhanh D Phan
(74) *Attorney, Agent, or Firm* — Troutman Pepper Hamilton Sanders LLP

(57) ABSTRACT

Embodiments provide a computer implemented method in a data processing system including a processor and a memory, the memory including instructions that are executed by the processor to cause the processor to implement a system for generating a type system. The method includes: receiving a document corpus; identifying frequently occurring words from the document corpus, disregarding stop words; extracting a conceptual text for each frequently occurring word from a structured information database; performing a cluster analysis on each conceptual text to identify possible entity types; performing a frequency analysis on possible entity types to select at least one entity type; identifying a relation type between entities in the document corpus; and generating the type system including entity types and relation types.

20 Claims, 5 Drawing Sheets

(56) References Cited

U.S. PATENT DOCUMENTS

| | | |
|---|---|---|
| 2006/0053172 A1 | 3/2006 | Gardner et al. |
| 2009/0012842 A1 | 1/2009 | Srinivasan et al. |
| 2013/0204886 A1* | 8/2013 | Faith ................. G06Q 30/0643 707/756 |
| 2013/0268260 A1* | 10/2013 | Lundberg ................ G06F 40/40 704/8 |
| 2017/0004414 A1 | 1/2017 | Flores et al. |

\* cited by examiner

GENERATION OF DOMAIN SPECIFIC TYPE SYSTEM

TECHNICAL FIELD

The present application relates generally to a system and method which are used to generate a domain-specific type system for a machine learning model to perform information extraction processes.

BACKGROUND

A machine learning (ML) model for information extraction relies on humans annotating documents in a corpus, thereby creating ground-truth data on which a model is trained. A type system defines entity types and relation types, thereby providing a structure on how to annotate data for a specific domain. Since a machine learning model for information extraction depends on the annotations which are based on the type system, it is crucial to develop a more domain-representative type system relevant to information extraction.

Currently, a type system generally depends on the machine-learning-model-building experience of the annotation process manager (APM) in a specific domain, such as metallurgy, geology, market intelligence, life science, or electronic health records, etc., to create the type system. The ideal APM would be experienced in using a ML based platform, such as Watson Knowledge Studio, while having prior natural language processing experience and expertise in the given domain. This drastically narrows the group of people who have a good chance of generating an appropriate type system. The human annotators are responsible for annotating the document corpus, based on the type system, to train the system. A machine learning model user is any end user to extract information from documents using the machine learning model trained as defined above.

Multiple iterations of generating and refining a type system take up a considerable amount of time. Currently, generation of a type system begins from a previously-generated type system of a different domain, or from a general-purpose type system, or starting from scratch. There is a need to generate a domain-specific type system, thereby reducing time in developing and refining the type system.

SUMMARY

Embodiments may provide a computer implemented method in a data processing system comprising a processor and a memory, the memory comprising instructions that are executed by the processor to cause the processor to implement a system for generating a type system, the method comprising receiving, by the processor, a document corpus, wherein the document corpus includes a plurality of documents related to a particular domain; identifying, by the processor, a plurality of frequently occurring words from the document corpus, disregarding a plurality of stop words; extracting, by the processor, a conceptual text for each frequently occurring word from a structured information database; performing, by the processor, a cluster analysis on each conceptual text to identify a plurality of possible entity types; performing, by the processor, a frequency analysis on the plurality of possible entity types to select at least one entity type; identifying, by the processor, at least one relation between entities in the document corpus, wherein a relation is identified between every two entities; identifying, by the processor, at least one relation type between the entities in the document corpus, wherein a relation type is identified between the every two entities based on two entity types of the every two entities and a plurality of words appearing before, between, and/or after the instances of the every two entities; and generating, by the processor, the type system including the at least one entity type and the at least one relation type.

Embodiments may further provide a method, wherein the structured information database comprises one or more of DBpedia, Stanford Encyclopedia, PubMed, and Domain ontologies.

Embodiments may further provide a method, wherein the at least one entity type is selected if the at least one entity type occurs more than a predefined number of times within the document corpus.

Embodiments may further provide a method, wherein the at least one relation is identified by executing a classifier to determine whether the relation exists between the every two entities.

Embodiments may further provide a method, wherein the classifier views at least one text before, between, and after the instances of the every two entities within a same sentence, and parses a plurality of semantic role labels, so that the relation is determined.

Embodiments may further provide a method, wherein the plurality of words occur more than a predefined number of times before, between, and after the instances of the every two entities.

Embodiments may further provide a method, further comprising providing, by the processor, a user interface to allow the machine learning model user to add, view, update, or delete the at least one entity type and the at least one relation type.

In another illustrative embodiment, a computer program product comprising a computer usable or readable medium having a computer readable program is provided. The computer readable program, when executed on a processor, causes the processor to perform various ones of and combinations of the operations outlined above with regard to the method illustrative embodiment.

In yet another illustrative embodiment, a system is provided. The system may comprise a type system processor configured to perform various ones and combinations of, the operations outlined above with regard to the method illustrative embodiment.

Additional features and advantages of this disclosure will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawing embodiments that are presently preferred, it being understood, however, that the invention is not limited to the specific instrumentalities disclosed. Included in the drawings are the following Figures.

DETAILED DESCRIPTION OF EXEMPLARY EMBODIMENTS

Figure 1:
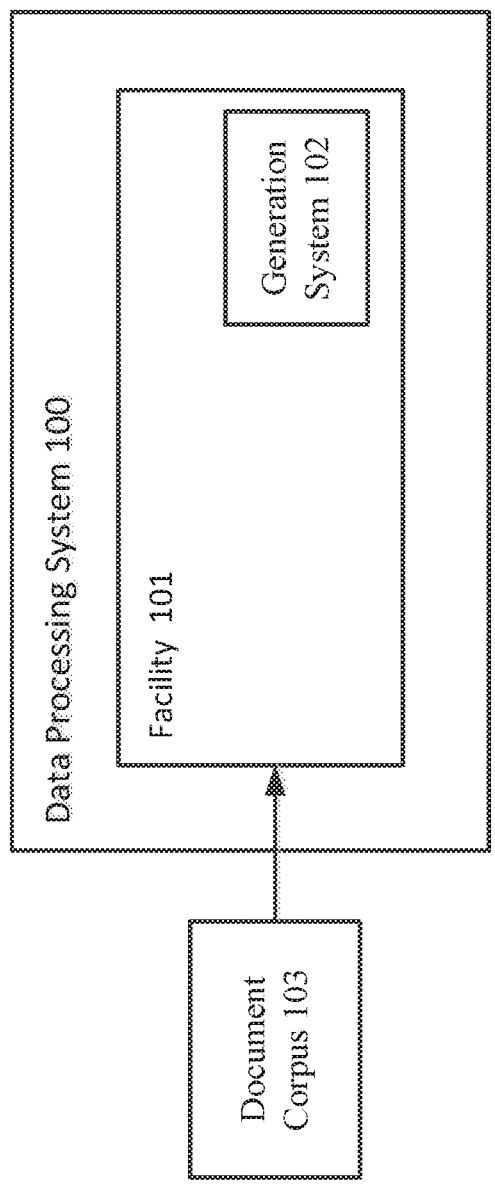
FIG. 1 is a block diagram of an example data processing system in which aspects of the illustrative embodiments may be implemented.

Embodiments of the present invention may be a system, a method, and/or a computer program product. The computer program product may include a computer readable storage medium (or media) having computer readable program instructions thereon for causing a processor to carry out aspects of the present invention.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network (LAN), a wide area network (WAN) and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

In an embodiment, a system and method for generating a domain specific type system are disclosed. With the system and method, the domain specific type system is generated based on the document corpus provided by the machine learning modelers.

FIG. 1 is a block diagram of an example data processing system 100 in which aspects of the illustrative embodiments are implemented. Data processing system 100 is an example of a computer, such as a server or client, in which computer usable code or instructions implementing the process for illustrative embodiments of the present invention are located. In one embodiment, FIG. 1 represents a server computing device, such as a server, which implements generation system 102 (a system for generating a domain specific type system) described herein.

In the depicted example, facility 101 is operating on the data processing system 100. The facility 101 can be any tool enabling training of statistical machine learning models for information extraction. For example, the facility can be IBM Watson Discovery Service, etc., running on the data processing system 100. In the depicted example, the generation system 102 is integrated in the machine learning model 101. In another example, the generation system 102 can be separate from the machine learning model 101. In the depicted example, document corpus 103, related to a particular domain, is uploaded into the machine learning model 101 by a facility user (for example, an annotation process manager), so that the generation system 102 can generate a domain specific type system based on the document corpus 103.

Figure 2:
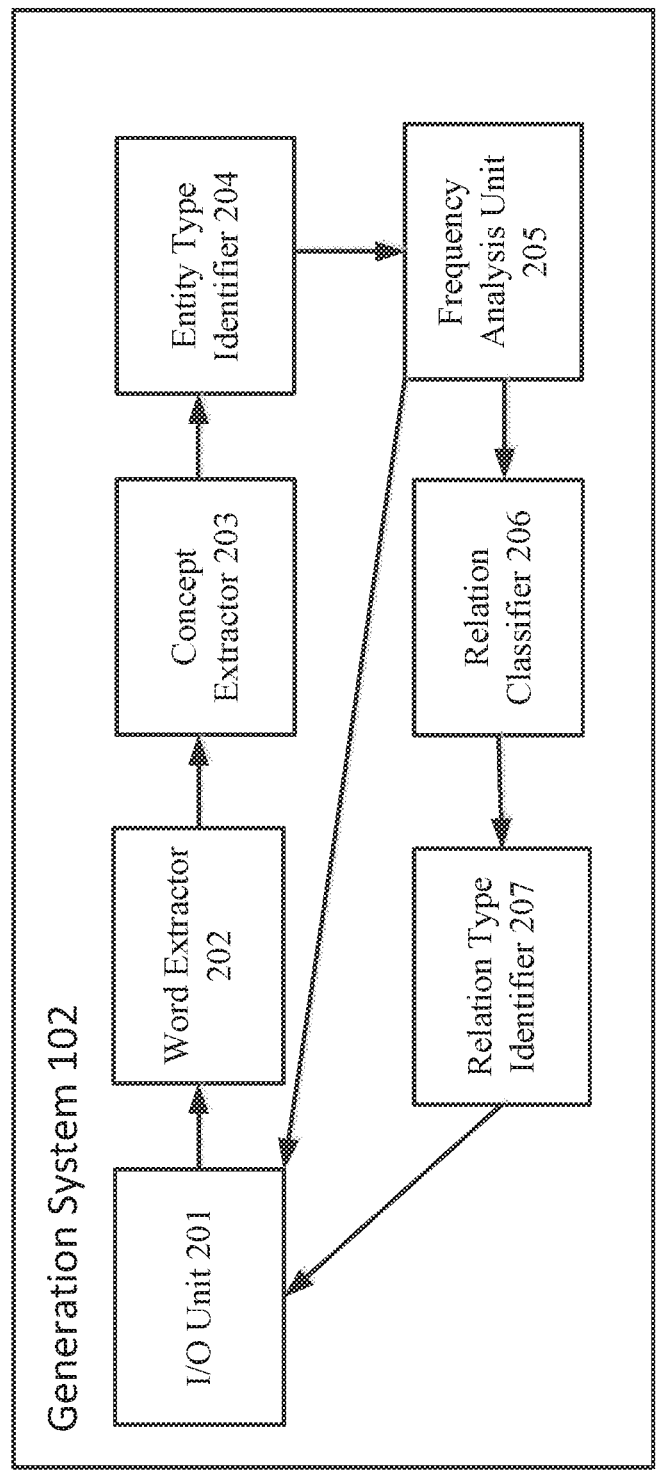
FIG. 2 is a block diagram of an example generation system, according to some embodiments described herein.

FIG. 2 is a block diagram of an example generation system 102, according to some embodiments described herein. In the depicted example, the generation system 102 includes I/O unit 201, word extractor 202, concept extractor 203, entity type identifier 204, frequency analysis unit 205, relation classifier 206, and relation type identifier 207. The I/O unit 201 is configured to receive the document corpus 103 uploaded by a facility user (for example, an annotation process manager). The I/O unit 201 is further configured to output the generated type system to a runtime for a machine learning end user via a user interface on a display. The word extractor 202 is configured to identify the most frequently occurring words on the document corpus. The concept extractor 203 is configured to extract a conceptual text for each identified word. The entity type identifier 204 is configured to perform a cluster analysis on each conceptual text to identify potential entity types. The frequency analysis unit 205 is configured to perform a frequency analysis on the potential entity types to select entity types used to form the type system. The relation classifier 206 is configured to identify potential relations between entities. The relation type identifier 207 is configured to identify relation types used to form the type system. The relation types identified by the relation type identifier 207 and the entity types identified by the frequency analysis unit 205 are sent to the I/O unit 201 to form the type system which is presented to the machine learning model user.

It will also be noted that each unit of the generation system 102 may be implemented on a special purpose hardware-based system, for example the data processing system 100, which performs specified functions or acts or carries out combinations of special purpose hardware and computer instructions.

Figure 3:
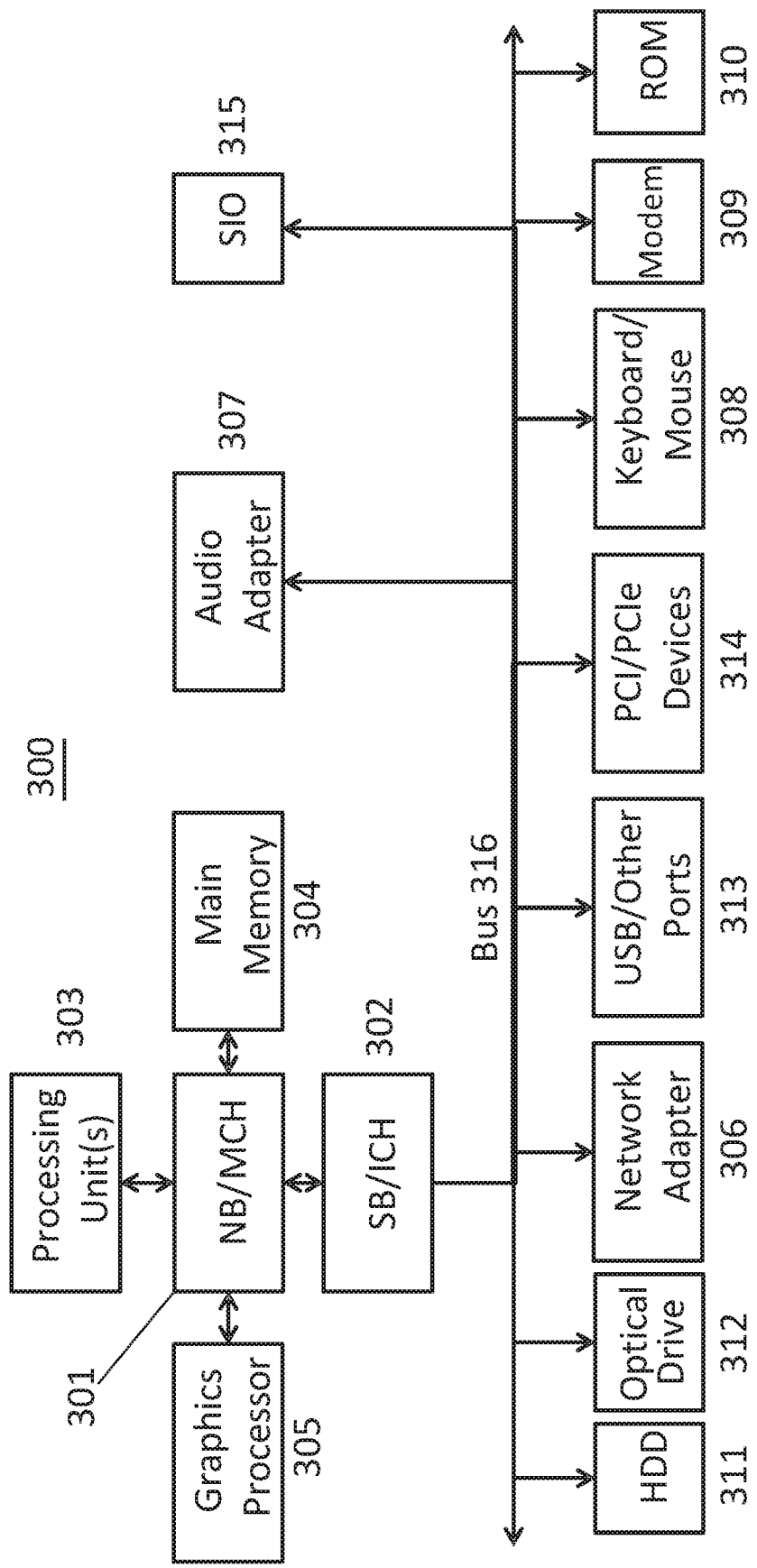
FIG. 3 is a block diagram of another example data processing system in which aspects of the illustrative embodiments may be implemented.

FIG. 3 is a block diagram of an example data processing system 300 in which aspects of the illustrative embodiments may be implemented. Data processing system 300 is an example of a computer, such as a server or client, in which computer usable code or instructions implementing the process for illustrative embodiments of the present invention are located. In one embodiment, FIG. 3 represents a server computing device, such as a server, which implements the generation system described herein.

In the depicted example, data processing system 300 may employ a hub architecture including a north bridge and memory controller hub (NB/MCH) 301 and south bridge and input/output (I/O) controller hub (SB/ICH) 302. Processing unit 303, main memory 304, and graphics processor 305 may be connected to the NB/MCH 301. Graphics processor 305 may be connected to the NB/MCH 301 through an accelerated graphics port (AGP).

In the depicted example, the network adapter 306 connects to the SB/ICH 302. The audio adapter 307, keyboard and mouse adapter 308, modem 309, read only memory (ROM) 310, hard disk drive (HDD) 311, optical drive (CD or DVD) 312, universal serial bus (USB) ports and other communication ports 313, and the PCI/PCIe devices 314 may connect to the SB/ICH 302 through bus system 316. PCI/PCIe devices 314 may include Ethernet adapters, add-in cards, and PC cards for notebook computers. ROM 310 may be, for example, a flash basic input/output system (BIOS). The HDD 311 and optical drive 312 may use an integrated drive electronics (IDE) or serial advanced technology attachment (SATA) interface. The super I/O (SIO) device 315 may be connected to the SB/ICH.

An operating system may run on processing unit 303. The operating system could coordinate and provide control of various components within the data processing system 300. As a client, the operating system may be a commercially available operating system. An object-oriented programming system, such as the Java™ programming system, may run in conjunction with the operating system and provide calls to the operating system from the object-oriented programs or applications executing on the data processing system 300. As a server, the data processing system 300 may be an IBM® eServer™ System p® running the Advanced Interactive Executive operating system or the Linux operating system. The data processing system 300 may be a symmetric multiprocessor (SMP) system that may include a plurality of processors in the processing unit 303. Alternatively, a single processor system may be employed.

Instructions for the operating system, the object-oriented programming system, and applications or programs are located on storage devices, such as the HDD 311, and are loaded into the main memory 304 for execution by the processing unit 303. The processes for embodiments of the generation system may be performed by the processing unit 303 using computer usable program code, which may be located in a memory such as, for example, main memory 304, ROM 310, or in one or more peripheral devices.

A bus system 316 may be comprised of one or more busses. The bus system 316 may be implemented using any type of communication fabric or architecture that may provide for a transfer of data between different components or devices attached to the fabric or architecture. A communication unit such as the modem 309 or network adapter 306 may include one or more devices that may be used to transmit and receive data.

Those of ordinary skill in the art will appreciate that the hardware depicted in FIG. 3 may vary depending on the implementation. Other internal hardware or peripheral devices, such as flash memory, equivalent non-volatile memory, or optical disk drives may be used in addition to or in place of the hardware depicted. Moreover, the data processing system 300 may take the form of a number of different data processing systems, including but not limited to, client computing devices, server computing devices, tablet computers, laptop computers, telephone or other communication devices, personal digital assistants, and the like. Essentially, data processing system 300 may be any known or later developed data processing system without architectural limitation.

Figure 4:
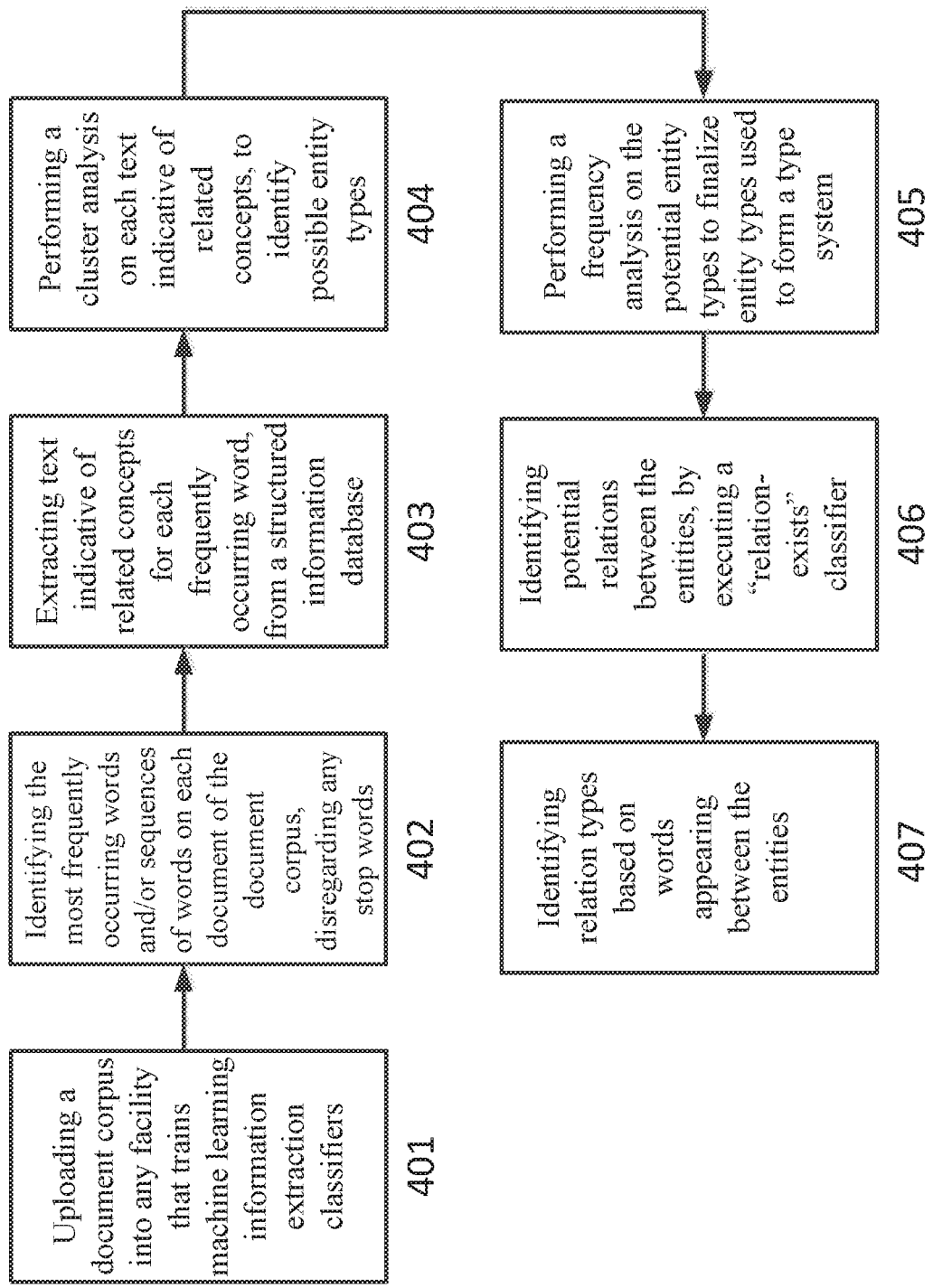
FIG. 4 depicts a flowchart illustrating the functionality of a generation system, according to some embodiments described herein.

FIG. 4 depicts a flowchart illustrating the functionality of a generation system according to some embodiments described herein. In some embodiments, the generation system performs the following steps:

Step 401: an annotation process manager uploads a document corpus into any facility that trains machine learning information extraction classifiers. The document corpus includes a significant number of documents. The facility is any tool enabling training of statistical machine learning models for information extraction. For example, the facility can be IBM Watson Knowledge Studio. Further, in this embodiment, a system for generating the domain specific type system is integrated in the facility.

Step 402: a generation system (i.e., a system for generating the domain specific type system) identifies the most frequently occurring words on each document of the document corpus, optionally disregarding any stop words, such as "the," "or," and "and," etc.

Step 403: for each word identified in the step 402, the generation system looks each word up in an existing structured information database, such as DBpedia, Stanford Encyclopedia, PubMed, Domain ontologies, etc., to extract conceptual information. For example, if the word "Honda" was identified in the step 402, the generation system searches the word "Honda" in the DBpedia, and extracts the conceptual text (i.e., text indicative of related concepts) "Japanese public multinational conglomerate corporation primarily known as a manufacturer of automobiles, aircraft, motorcycles, and power equipment".

Step 404: the generation system performs a cluster analysis on each conceptual text extracted from the structured information database, to identify possible entity types for the type system. For example, for the extracted conceptual text "Japanese public multinational conglomerate corporation primarily known as a manufacturer of automobiles, aircraft, motorcycles, and power equipment," a possible entity type "automobile manufacturer" will be identified.

Step 405: the generation system performs a frequency analysis on the potential entity types identified in the step 404. Among the potential entity types, the generation system removes one or more potential entity types that occur less than the predefined number of times within the document corpus. The remaining entity types are used to form the type system. Because the entity types used to form the type system are based on the most frequently occurring words and word sequences on each document of the document corpus, the type system to be formed is relevant to the document corpus, and thus relevant to the specific domain of the document corpus. After the entity types are determined, all the mentions in each document of the document corpus are annotated with the determined entity types. A mention is any span of text in the document corpus that the machine learning model considers relevant to the domain of the document corpus. For example, ire a document about automotive vehicles, the terms like "airbag", "Ford Explorer", and "child restraint system" might be relevant mentions for the domain.

Step 406: the generation system identifies potential relations between the entities identified in the step 405, by executing a "relation-exists" classifier. The "relation-exists" classifier is a component of a relation detector, and only used to determine whether a relation exists between two entities. The "relation-exists" classifier looks for domain independent cues that predict the existence or non-existence of a relation between two entity types. This classifier views the texts before, between, and/or after the instances of every two entities (i.e., any span of text relevant to the domain of the document corpus) within the same sentence, and parses features and semantic role labels to detect a relation. The relation identification may involve lexical features of the entities or mentions, and the entity types in the sentence. The lexical features include descriptive units of the entities or mentions, such as noun (N), verb (V), Adjective (A) etc., as well as features reflecting the text, such as letter sequences. In an embodiment, the letter sequences include roots, prefixes, and suffixes. The lexical features and the entity types are domain dependent, and the "relation-exists" classifier may need to be trained, by human trainers, through the document corpus in a specific domain.

Step 407: the generation system identifies relation types based on words (i.e., tokens) appearing before, between, and/or after the instances of every two entities. In an embodiment, the generation system particularly looks for words least common in general usage. Among those words least common in general usage, the generation system searches for the most frequently occurring words before, between, and/or after the entities or mentions (for example, the words occur more than a predefined number of times before, between, and/or after the instances of every two entities or mentions). Accordingly, the generation system can identify the most frequently occurring relations, and suggests a relation type based on the entity types of every two entities or mentions and the words appearing before, between, and/or after every two entities or mentions.

In some embodiments, a user interface is provided to allow the machine learning model user to add, view, update, and delete entity types and relation types. Specifically, the machine learning model user can add more entity types and relation types, in addition to the entity types and relation types generated by the generation system. Further, the machine learning model user can view some of or all of the entity types and relation types generated by the generation system. Furthermore, the machine learning model user can revise or update any entity types and relation types generated by the generation system. Moreover, the machine learning model user can delete any entity types and relation types generated by the generation system. In addition, the machine learning model user can adjust the hierarchy of entity types and relation types formed by the generation system.

Figure 5:
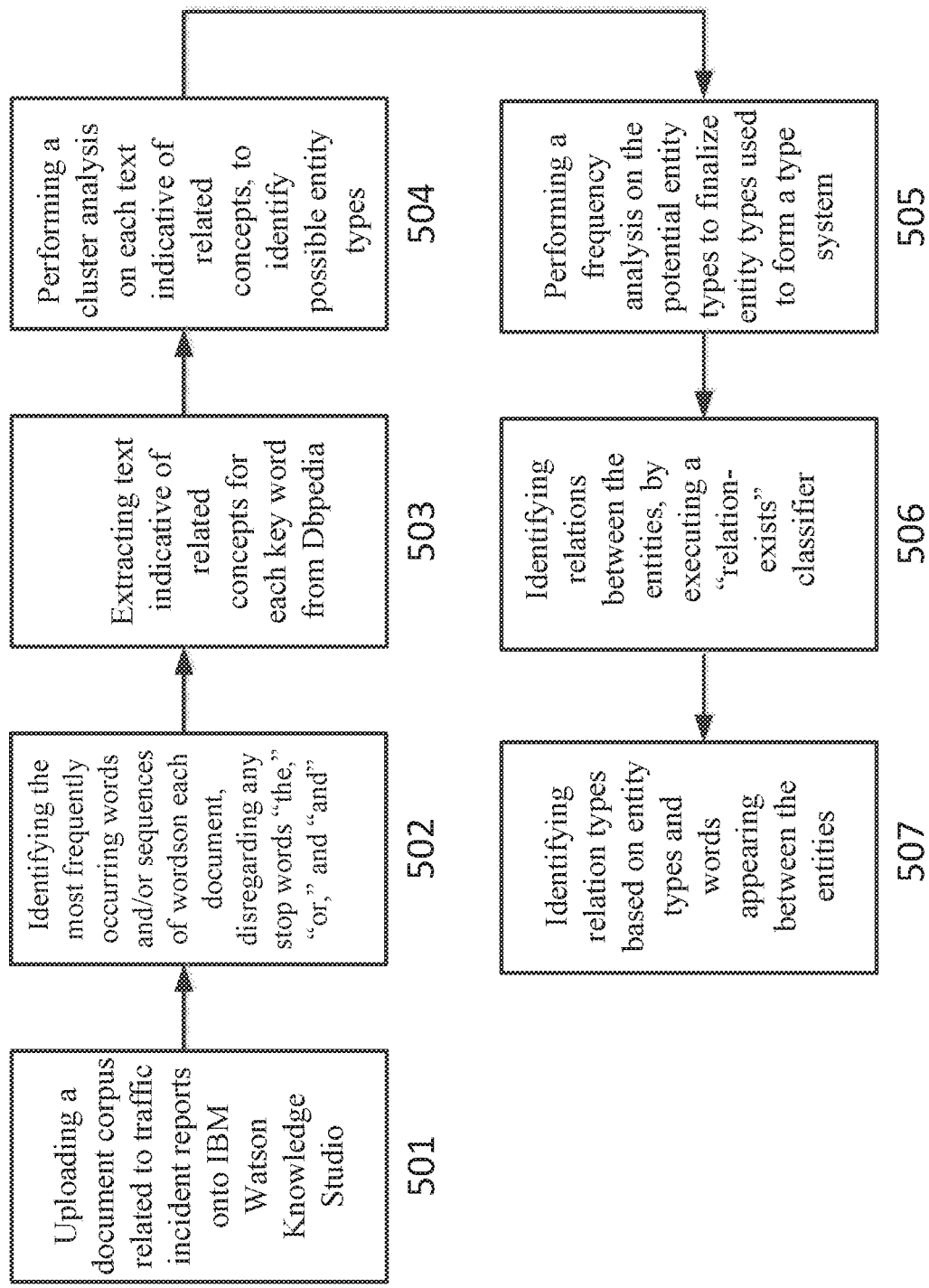
FIG. 5 depicts a flowchart illustrating an example of functionality of a generation system, according to some embodiments described herein.

FIG. 5 depicts a flowchart illustrating an example of functionality of a generation system, according to some embodiments described herein. In this example, the generation system performs the following steps:

Step 501: multiple documents that describe traffic incident reports (11R) are uploaded onto IBM Watson Knowledge Studio. In this embodiment, a system for generating the domain specific type system is integrated in IBM Watson Knowledge Studio.

In this example, a paragraph of text is extracted from one of the documents and provided below: "A restrained 21-year-old male driver occupied the vehicle. Air bag, knee air bag, both frontal air bags, and left IC air bag deployed during the crash. The driver sustained minor injuries. A restrained 19-year-old male driver occupied the Ford."

Step 502: the generation system (i.e., a system for generating the domain specific type system) identifies key concepts, key topics, or key words in the documents, optionally, disregarding any stop words such as "the," "or," and "and."

In the paragraph of text provided above, the identified key words include: "21 year old," "male," "air bag," "knee air bag," "frontal air bags," "left IC air bag," "crash," "minor injuries," "19 year old," "male," "Ford," and "driver."

Step 503: the generation system searches each identified key word in an information database, such as Dbpedia, and each identified key word is mapped to an overarching concept in Dbpedia. Specifically, corresponding to the identified key words provided above, the conceptual texts obtained from Dbpedia are: "Age," "Gender," "Vehicle," "Safety Features," "Accident," "Injury Type," "Car Manufacturer," "Subject," respectively.

Step 504: the generation system performs a cluster analysis on each conceptual text provided above, to identify possible entity types for the type system.

Step 505: the generation system performs a frequency analysis on the possible entity types obtained in the step 504, to identify the qualified entity types that are used to form the type system.

In this example, all the conceptual texts provided in the step 503 are kept as entity types that are used to form the type system. However, in another example, if some of the conceptual texts are relatively long, then the corresponding entity types are different from these long conceptual texts. Specifically, a cluster analysis is performed on the long conceptual texts, to obtain shorter and concise entity types. Further, some of possible entity types may be removed through a frequency analysis, and the remaining entity types are used to form the type system. The criteria of the cluster analysis and the frequency analysis are decided by machine learning model developers, and then the cluster analysis and the frequency analysis are trained, by human trainers, with respect to the criteria.

Step 506: the generation system identifies potential relations between the entities identified in the step 505, through a classifier used to determine whether a relation exists between two entities. In this example, relations are found between "Age" and "Gender" (21 year old male), "Safety Features" and "Accident," "Subject" and "Injury Type," "Gender" and "Car Manufacturer."

Step 507: the generation system identifies relation types based on entity types and words appearing between the entities. The words between two entities indicate a relation between these two entities. If certain words between two entities have more frequent occurrences, then a relation derived from the certain words also has more frequent occurrences. For every two entities, different relation types are suggested based on entity types of the two entities and the words appearing between the two entities. Each of the different relation types is scored, and the most relative relation type between the two entities is the one having the highest score. All the relation types, each having the highest score, are used to form the type system.

In this example, the relation type between "Age" and "Gender" (21 year old male) is "AgeOf" the relation type between "Gender" and "vehicle" is "Traveling In," the relation type between "Safety Features" and "Accident" is "Activated," the relation type between "Subject" and "Injury Type" is "Injury Scale," and the relation type between "Gender" and "Car Manufacturer" is "Traveling In." These determined relation types can be used to form the type system.

In an embodiment, the type system to be formed is based on the document corpus in a specific domain (for example, traffic incident domain), and thus the type system is relevant to the specific domain. Accordingly, multiple iterations of generating and refining the type system to adapt to the specific domain are avoided.

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one may also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The system and processes of the figures are not exclusive. Other systems, processes, and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers and processes may be implemented using hardware components, software components, and/or combinations thereof. No claim element herein is to be construed under the provisions of 35 U.S.C. 112(f) unless the element is expressly recited using the phrase "means for."

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A computer implemented method in a data processing system comprising a processor and a memory, the memory comprising instructions that are executed by the processor to cause the processor to implement a system for generating a type system, the method comprising:

receiving, by the processor, a document corpus, wherein the document corpus includes a plurality of documents related to a particular domain;

identifying, by the processor, a plurality of frequently occurring words from the document corpus, disregarding a plurality of stop words;

extracting, by the processor, a conceptual text for each frequently occurring word from a structured information database, wherein the conceptual text includes at least two words;

performing, by the processor, a cluster analysis on each conceptual text to identify a plurality of possible entity types;

selecting, by the processor, at least one entity type from the plurality of possible entity types based on a frequency of occurring words and word sequences;

identifying, by the processor, at least one relation between entities in the document corpus, wherein a relation is identified between every two entities;

identifying, by the processor, at least one relation type between the entities in the document corpus, wherein a relation type is identified between the every two entities based on two entity types of the every two entities and a plurality of words appearing before, between, and after instances of the every two entities within a same sentence; and generating, by the processor, the type system including the at least one entity type and the at least one relation type.

2. The method as recited in claim 1, wherein the structured information database comprises one or more of DBpedia, Stanford Encyclopedia, PubMed, and Domain ontologies.

3. The method as recited in claim 1, wherein the at least one entity type is selected if the at least one entity type occurs more than a predefined number of times within the document corpus.

4. The method as recited in claim 1, wherein the at least one relation is identified by executing a classifier to determine whether the relation exists between the every two entities.

5. The method as recited in claim 4, wherein the classifier views at least one text before, between, and after the instances of the every two entities within a same sentence, and parses a plurality of semantic role labels, so that the relation is determined.

6. The method as recited in claim 1, wherein the plurality of words occur more than a predefined number of times before, between, or after the instances of the every two entities.

7. The method as recited in claim 1, further comprising:
    providing, by the processor, a user interface to allow the machine learning model user to add, view, update, or delete the at least one entity type and the at least one relation type.

8. A computer program product for generating a type system, the computer program product comprising a computer readable storage medium having program instructions embodied therewith, the program instructions executable by a processor to cause the processor to:

receive a document corpus, wherein the document corpus includes a plurality of documents related to a particular domain;

identify a plurality of frequently occurring words from the document corpus, disregarding a plurality of stop words;

extract a conceptual text for each frequently occurring word from a structured information database, wherein the conceptual text includes at least two words;

perform a cluster analysis on each conceptual text to identify a plurality of possible entity types;

select at least one entity type from the plurality of possible entity types based on a frequency of occurring words and word sequences;

identify at least one relation between entities in the document corpus, wherein a relation is identified between every two entities;

identify at least one relation type between the entities in the document corpus, wherein a relation type is identified between the every two entities based on two entity types of the every two entities and a plurality of words appearing before, between, and after instances of the every two entities within a same sentence; and generate the type system including the at least one entity type and the at least one relation type.

9. The computer program product as recited in claim 8, wherein the structured information database comprises one or more of DBpedia, Stanford Encyclopedia, PubMed, and Domain ontologies.

10. The computer program product as recited in claim 8, wherein the at least one entity type is selected if the at least one entity type occurs more than a predefined number of times within the document corpus.

11. The computer program product as recited in claim 8, the at least one relation is identified by executing a classifier to determine whether the relation exists between the every two entities.

12. The computer program product as recited in claim 11, wherein the classifier views at least one text before, between, and after the instances of the every two entities within a same sentence, and parses a plurality of semantic role labels, so that the relation is determined.

13. The computer program product as recited in claim 8, wherein the plurality of words occur more than a predefined number of times before, between, or after the instances of the every two entities.

14. The computer program product as recited in claim 8, wherein the processor is further configured to:
    provide a user interface to allow the machine learning model user to add, view, update, or delete the at least one entity type and the at least one relation type.

15. A system for generating a domain specific type system, comprising:

a type system processor configured to:

receive a document corpus, wherein the document corpus includes a plurality of documents related to a particular domain;

identify a plurality of frequently occurring words from the document corpus, disregarding a plurality of stop words;

extract a conceptual text for each frequently occurring word from a structured information database, wherein the conceptual text includes at least two words;

perform a cluster analysis on each conceptual text to identify a plurality of possible entity types;

select at least one entity type from the plurality of possible entity types based on a frequency of occurring words and word sequences;

identify at least one relation between entities in the document corpus, wherein a relation is identified between every two entities;

identify at least one relation type between the entities in the document corpus, wherein a relation type is identified between the every two entities based on two entity types of the every two entities and a plurality of words appearing before, between, and after instances of the every two entities within a same sentence; and generate the type system including the at least one entity type and the at least one relation type.

16. The system as recited in claim 15, wherein the structured information database comprises one or more of DBpedia, Stanford Encyclopedia, PubMed, and Domain ontologies.

17. The system as recited in claim 15, wherein the at least one entity type is selected if the at least one entity type occurs more than a predefined number of times within the document corpus.

18. The system as recited in claim 15, the at least one relation is identified by executing a classifier to determine whether the relation exists between the every two entities.

19. The system as recited in claim 18, wherein the classifier views at least one text before, between, and after the instances of the every two entities within a same sentence, and parses a plurality of semantic role labels, so that the relation is determined.

20. The system as recited in claim 15, wherein the plurality of words occur more than a predefined number of times before, between, or after the instances of the every two entities.

* * * * *